United States Patent
Krause Perin et al.

(10) Patent No.: US 11,860,282 B2
(45) Date of Patent: Jan. 2, 2024

(54) TECHNIQUES FOR IDENTIFYING OBSTRUCTIONS IN A LIDAR SYSTEM

(71) Applicant: AEVA, INC., Mountain View, CA (US)

(72) Inventors: Jose Krause Perin, Mountain View, CA (US); Kumar Bhargav Viswanatha, Santa Clara, CA (US); Rajendra Tushar Moorti, Mountain View, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/838,962

(22) Filed: Jun. 13, 2022

(65) Prior Publication Data

US 2022/0308235 A1 Sep. 29, 2022

Related U.S. Application Data (63) Continuation of application No. 17/201,145, filed on Mar. 15, 2021, now Pat. No. 11,360,219, which is a (Continued)

(51) Int. Cl.

| | |
|---|---|
| *G01S 7/481* | (2006.01) |
| *G01S 7/497* | (2006.01) |
| *G01S 17/931* | (2020.01) |
| *G01S 17/89* | (2020.01) |
| *G01S 17/34* | (2020.01) |

(52) U.S. Cl.
CPC .......... *G01S 17/931* (2020.01); *G01S 7/4817* (2013.01); *G01S 17/34* (2020.01); *G01S 17/89* (2013.01); *G01S 7/497* (2013.01); *G01S 2007/4975* (2013.01)

(58) Field of Classification Search
CPC ...... G01S 7/4817; G01S 7/4876; G01S 7/493; G01S 17/34; G01S 17/931
See application file for complete search history.

(56) References Cited

U.S. PATENT DOCUMENTS

| | | |
|---|---|---|
| 6,956,348 B2 | 10/2005 | Landry et al. |
| 7,973,701 B2 | 7/2011 | Lohmeier et al. |

(Continued)

FOREIGN PATENT DOCUMENTS

| | | |
|---|---|---|
| DE | 102017222618 A1 | 6/2019 |
| JP | 2003114277 A | 4/2003 |
| WO | 2020070751 A1 | 4/2020 |

OTHER PUBLICATIONS

"Lidar Scanner with Dust Droplet Rain Dirt Window" Computer-Readable Medium.

(Continued)

*Primary Examiner* — Eric L Bolda
(74) *Attorney, Agent, or Firm* — Womble Bond Dickinson (US) LLP (57) ABSTRACT

A light detection and ranging (LIDAR) system, includes an optical source to generate a frequency modulated continuous wave (FMCW) optical beam, a memory, and a processor, operatively coupled to the memory, to identify energy peaks in a frequency domain of a range-dependent baseband signal that corresponds to a return signal from a reflection of the FMCW optical beam and identify an obstruction of the LIDAR system based on a comparison of a frequency of the energy peaks to a threshold frequency.

20 Claims, 9 Drawing Sheets

Related U.S. Application Data continuation of application No. 16/994,109, filed on Aug. 14, 2020, now Pat. No. 10,969,491.

(56)  References Cited

U.S. PATENT DOCUMENTS

| | | |
|---|---|---|
| 7,986,397 B1 | 7/2011 | Tiemann et al. |
| 9,097,800 B1 | 8/2015 | Zhu |
| 2016/0274035 A1 | 9/2016 | Hasegawa |
| 2018/0284226 A1 | 10/2018 | Lachapelle et al. |
| 2019/0011558 A1 | 1/2019 | Crouch et al. |
| 2019/0077377 A1 | 3/2019 | Schmidt |
| 2019/0351873 A1 | 11/2019 | Dalal |
| 2020/0174156 A1 | 6/2020 | Terefe |
| 2020/0215972 A1 | 7/2020 | Herman et al. |
| 2020/0232895 A1 | 7/2020 | Herman et al. |
| 2020/0346255 A1 | 11/2020 | Robertson, Jr. et al. |

OTHER PUBLICATIONS

Transmittal of the International Search report and Written Opinion of the International Searching Authority dated May 3, 2021, for International Application No. PCT/US2020/048737, filed Aug. 31, 2020, pp. 13.

TECHNIQUES FOR IDENTIFYING OBSTRUCTIONS IN A LIDAR SYSTEM

CROSS-REFERENCE TO RELATED APPLICATIONS

This application is a continuation of U.S. application Ser. No. 17/201,145, filed on Aug. 14, 2020, which is a continuation of U.S. application Ser. No. 16/994,109, filed on Aug. 14, 2020, now U.S. Pat. No. 10,969,491, issued on Apr. 6, 2021, which is hereby incorporated by reference.

FIELD

The present disclosure is related to light detection and ranging (LIDAR) systems in general, and more particularly to the detection, evaluation and mitigation of obstructions on the viewing windows of LIDAR systems.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates a beat frequency at the receiver that is proportional to the distance to each target in the field of view of the system.

These systems can be used on autonomous vehicles for navigation, where the external environment can be harsh. To protect the optical, electro-optical and mechanical components of the systems, the optical beams are transmitted through sealed windows. However, the beams can be obstructed by rain, water droplets, mud, road salt, insects or other debris, which can block or attenuate the beams, creating a safety hazard.

SUMMARY

The present disclosure describes various examples of LIDAR systems and methods for detecting, evaluating and mitigating the effects of obstructions on LIDAR windows.

In one example, a LIDAR system according to the present disclosure includes an optical scanner to transmit an optical beam through a LIDAR window and to receive a return signal from reflections of the optical beam. The LIDAR system also includes an optical processing system to generate a range-dependent baseband signal corresponding to the return signal. The LIDAR system also includes a signal processing system including a processor and a non-transitory memory, where the memory contains instructions that, when executed by the processor, cause the LIDAR system to determine whether the return signal is caused by an obstruction on the LIDAR window, to determine operational effects of the obstruction on the LIDAR system, and to mitigate the operational effects of the obstruction.

In one example, to determine whether the return signal is caused by an obstruction on the LIDAR window, the signal processing system is configured to detect frequencies in the range-dependent baseband signal that are less than a threshold frequency.

In one example, to determine the operational effects of the obstruction, the LIDAR system is instructed generate a reflectivity map to identify an obstructed field of view (FOV) and energy reflected by the obstruction.

In one example, the LIDAR system is instructed to analyze the reflectivity map of the FOV to determine whether the obstructed FOV is a safety critical FOV, and to determine whether a maximum detection range is less than a minimum safety critical detection range.

In one example, where the LIDAR system is a vehicle-mounted system, the signal processing system is configured to mitigate the operational effects of the obstruction by one or more of slowing the vehicle, parking the vehicle, and cleaning the LIDAR window.

In one example, the LIDAR system includes an optical source to generate an FMCW optical beam, an optical coupler to receive the FMCW optical beam from the optical source, a polarization beam splitter (PBS) coupled with the optical coupler, to direct the FMCW optical beam to the optical scanner and to receive the return signal from the optical scanner, and a photodetector (PD) to receive the return signal from the PBS and a sample of the FMCW optical beam from the optical coupler, where the PD is configured to generate the range-dependent baseband signal from spatial mixing of the return signal with the sample of the FMCW optical beam.

In one example, the signal processing system includes a sampler coupled with the optical processing system to generate time domain samples of the range-dependent baseband signal, a discrete Fourier transform (DFT) processor coupled to the sampler to transform the time domain samples into the frequency domain, and a peak search processor coupled to the DFT processor to search for energy peaks at frequencies that are less than the threshold frequency.

In one example, the signal processing system also includes a frequency compensation processor coupled to the peak search engine to correct for Doppler scanning artifacts, and a post-processor coupled to the frequency compensation processor to generate a reflectivity map and a LIDAR window health report.

In one example, a method in a LIDAR system includes detecting an obstruction on or proximate to a LIDAR window from a LIDAR return signal, determining an operational effect of the LIDAR window obstruction on the LIDAR system and mitigating the operational effect of the LIDAR window obstruction on the LIDAR system.

In one example, a non-transitory computer-readable medium includes instructions for a processor in a LIDAR system that cause the LIDAR system to detect an obstruction on or proximate to a LIDAR window from a LIDAR return signal, determine an operational effect of the LIDAR window obstruction on the LIDAR system, and mitigate the operational effect of the LIDAR window obstruction on the LIDAR system.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes various examples of LIDAR systems and methods for detecting and mitigating the effects of obstructions on LIDAR windows. According to some embodiments, the described LIDAR system may be implemented in any sensing market, such as, but not limited to, transportation, manufacturing, metrology, medical, and security systems. According to some embodiments, the described LIDAR system is implemented as part of a front-end of frequency modulated continuous-wave (FMCW) device that assists with spatial awareness for automated driver assist systems, or self-driving vehicles.

Figure 1:
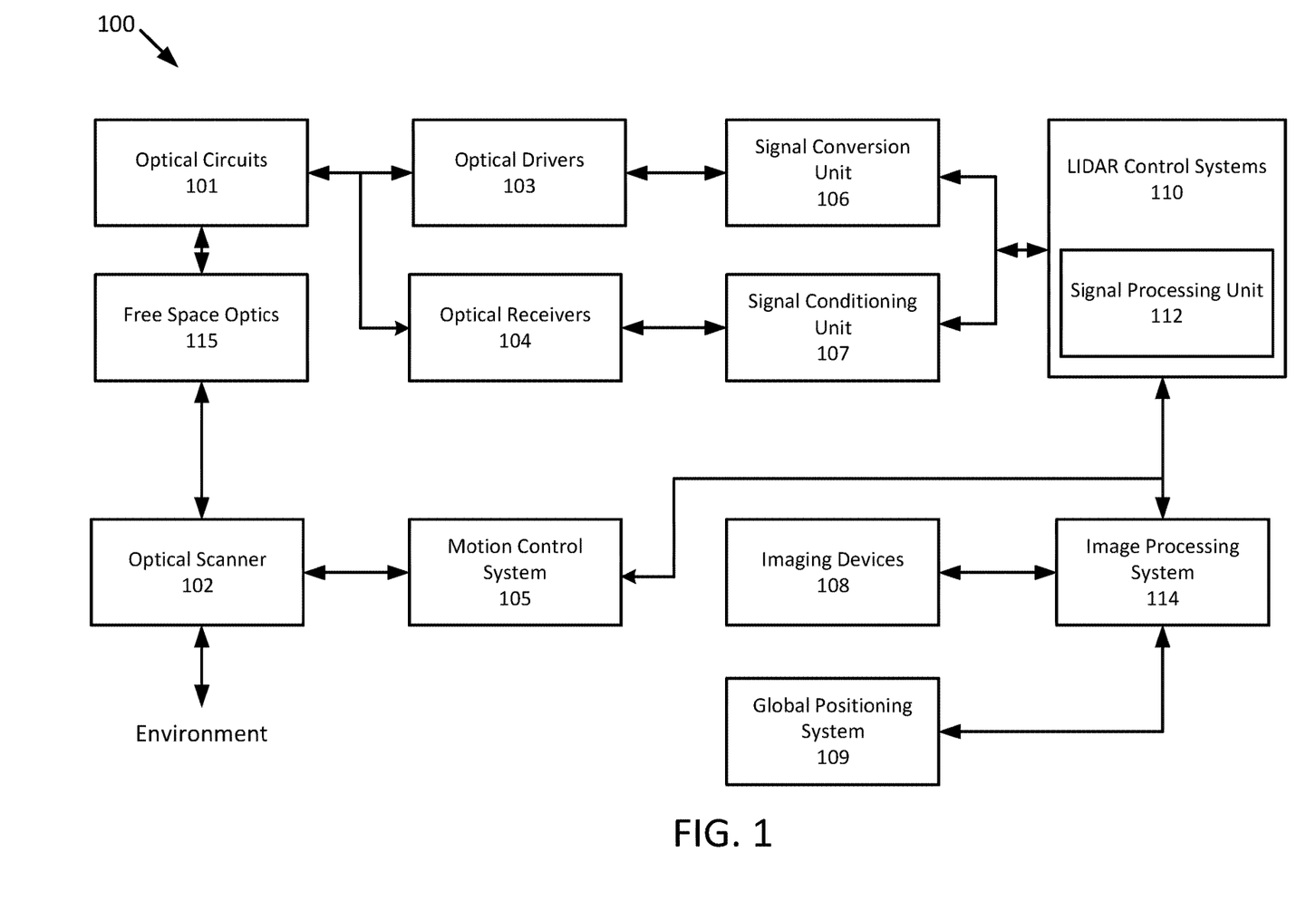
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 114. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
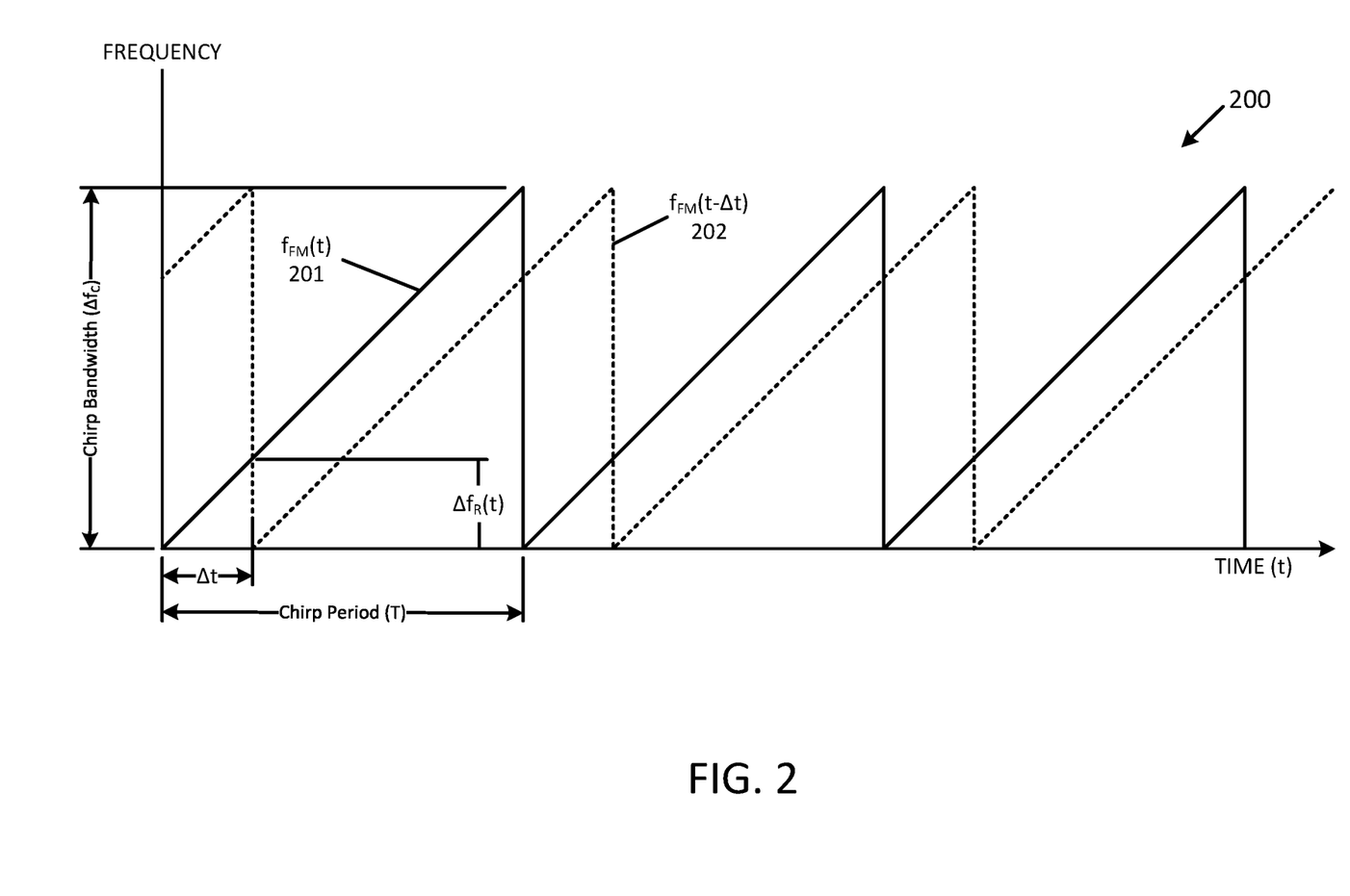
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(C/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
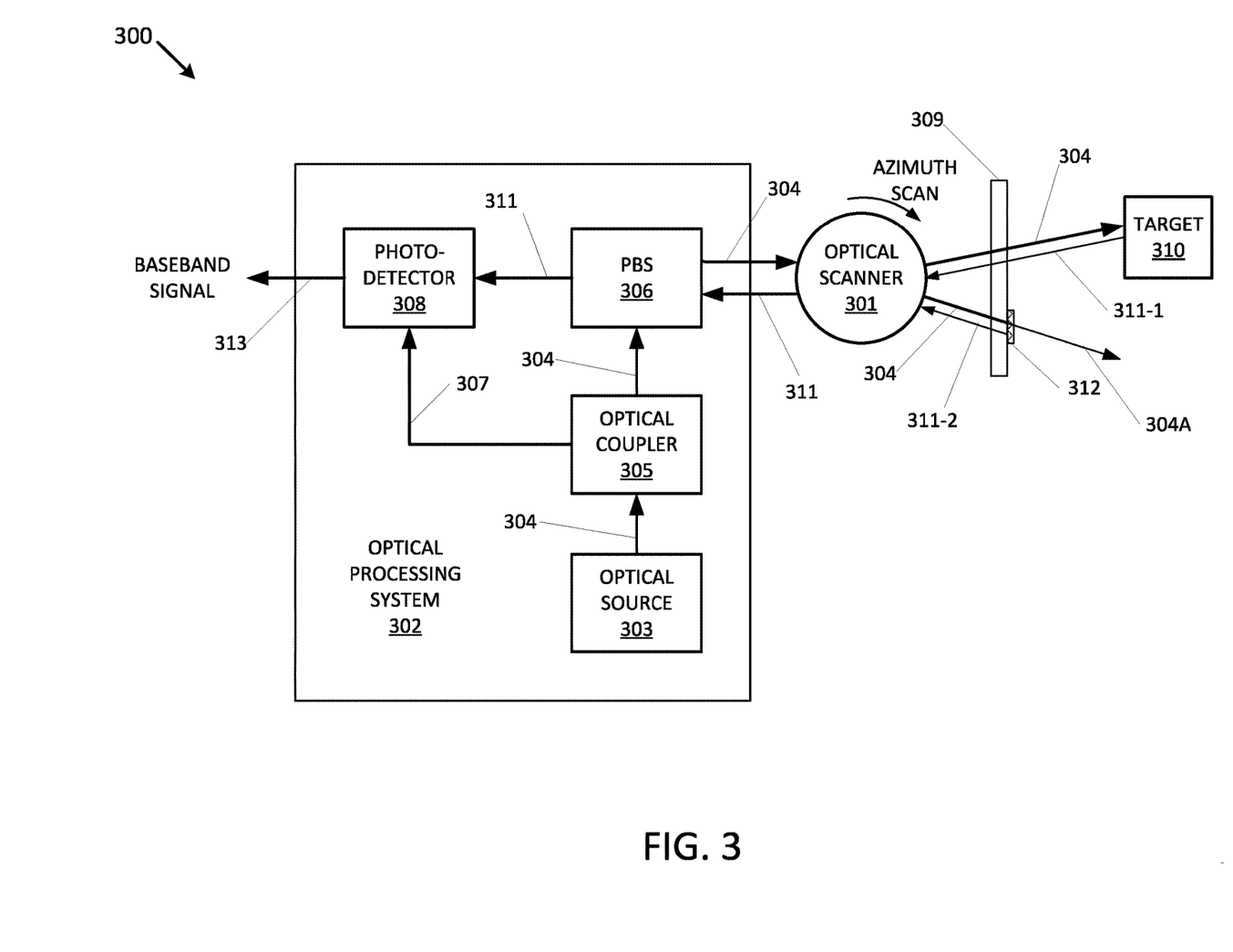
FIG. 3 is a block diagram illustrating an example optical processing system according to the present disclosure.

FIG. 3 is a block diagram illustrating an example optical system 300 according to some embodiments. Optical system 300 may include an optical scanner 301, similar to the optical scanner 102 illustrated and described in relation to FIG. 1. Optical system 300 may also include an optical processing system 302, which may include elements of free space optics 115, optical circuits 101, optical drivers 103, optical receivers 104 and signal conversion unit 106, for example.

Optical processing system 302 may include an optical source 303 to generate a frequency-modulated continuous-wave (FMCW) optical beam 304. The optical beam 304 may be directed to an optical coupler 305, that is configured to couple the optical beam 304 to a polarization beam splitter (PBS) 306, and a sample 307 of the optical beam 304 to a photodetector (PD) 308. The PBS 306 is configured to direct the optical beam 304, because of its polarization, toward the optical scanner 301. Optical scanner 301 is configured to scan a target environment with the optical beam 304, through a range of azimuth and elevation angles covering the field of view (FOV) of a LIDAR window 309. In FIG. 3, for ease of illustration, only the azimuth scan is illustrated.

As shown in FIG. 3, at one azimuth angle (or range of angles), the optical beam 304 may pass through the LIDAR window 309 unobstructed and illuminate a target 310. A return signal 311-1 from the target 310 will pass unobstructed through LIDAR window 309 and be directed by optical scanner 301 back to the PBS 306. At a later time in the scan (i.e., increased azimuth angle), the optical beam 304 may be directed by optical scanner 301 to a location on the LIDAR window 309 that is obstructed or partially obstructed by an obstruction 312. As a result, the optical beam 304 will pass through the LIDAR window 309 and be reflected or partially reflected by the obstruction 312. A return signal 311-2 from the obstruction 312 will pass back through the LIDAR window 309 and be directed by optical scanner 301 back to the PBS 306. Also illustrated in FIG. 3 is an attenuated optical beam 304A that represents an attenuated portion of optical beam 304 that is not reflected or absorbed by obstruction 312. For simplicity, the attenuated optical beam 304A is not shown to be illuminating another target.

The combined return signal 311 (a time domain signal that includes the return signal 311-1 from target 310 and return 311-2 from obstruction 312), which will have a different polarization than the optical beam 304 due to reflection from the target 310 or the obstruction 312, is directed by the PBS 306 to the photodetector (PD) 308. In PD 308, the combined return signal 311 is spatially mixed with the local sample 307 of the optical beam 304 to generate a range-dependent baseband signal 313 in the time domain. The range-dependent baseband signal 313 is the frequency difference between the local sample of 307 and the combined return signal 311 versus time (i.e., $\Delta f_R(t)$).

Figure 4:
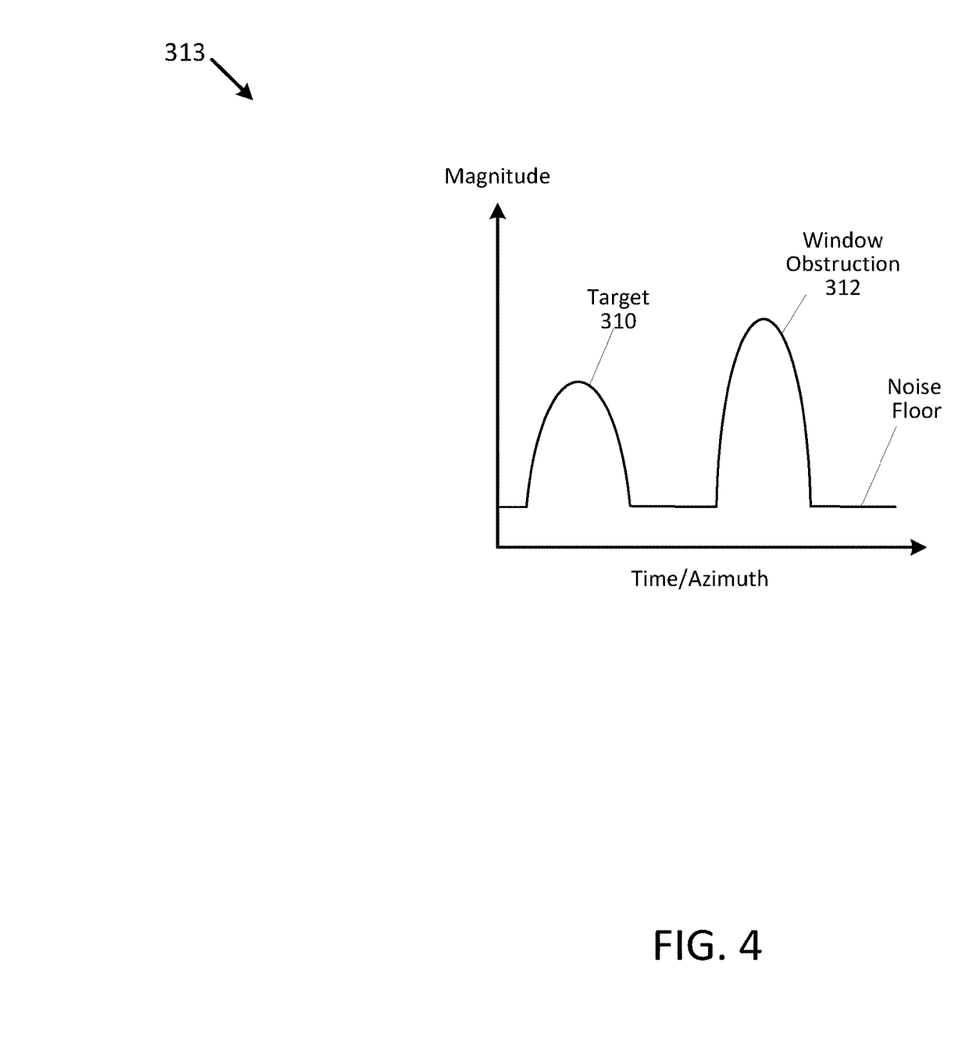
FIG. 4 is a time-magnitude plot illustrating an example of a time domain range-dependent baseband signal according to the present disclosure.

FIG. 4 is a time-magnitude plot of an example of the time domain range-dependent baseband signal 313 produced by embodiments of the present disclosure. In FIG. 4, the horizontal axis can represent time or the azimuth scan angle which is a function of time. Given the scanning direction illustrated and described with respect to FIG. 3, the optical beam 304 is first reflected by the target 310 as illustrated in FIG. 4, and then reflected by the obstruction 312. It should be noted that, while the magnitude of the signal due to the obstruction 312 in FIG. 4 is shown as larger than the signal due to target 310, that may not always be the case, depending on the range of the target and the coefficient of reflection of the obstruction 312. As described below in FIG. 5, for example, signal processing systems described by embodiments of the present disclosure process the information depicted in FIG. 4 to produce discrete time domain sequences that can be used for further processing.

Figure 5:
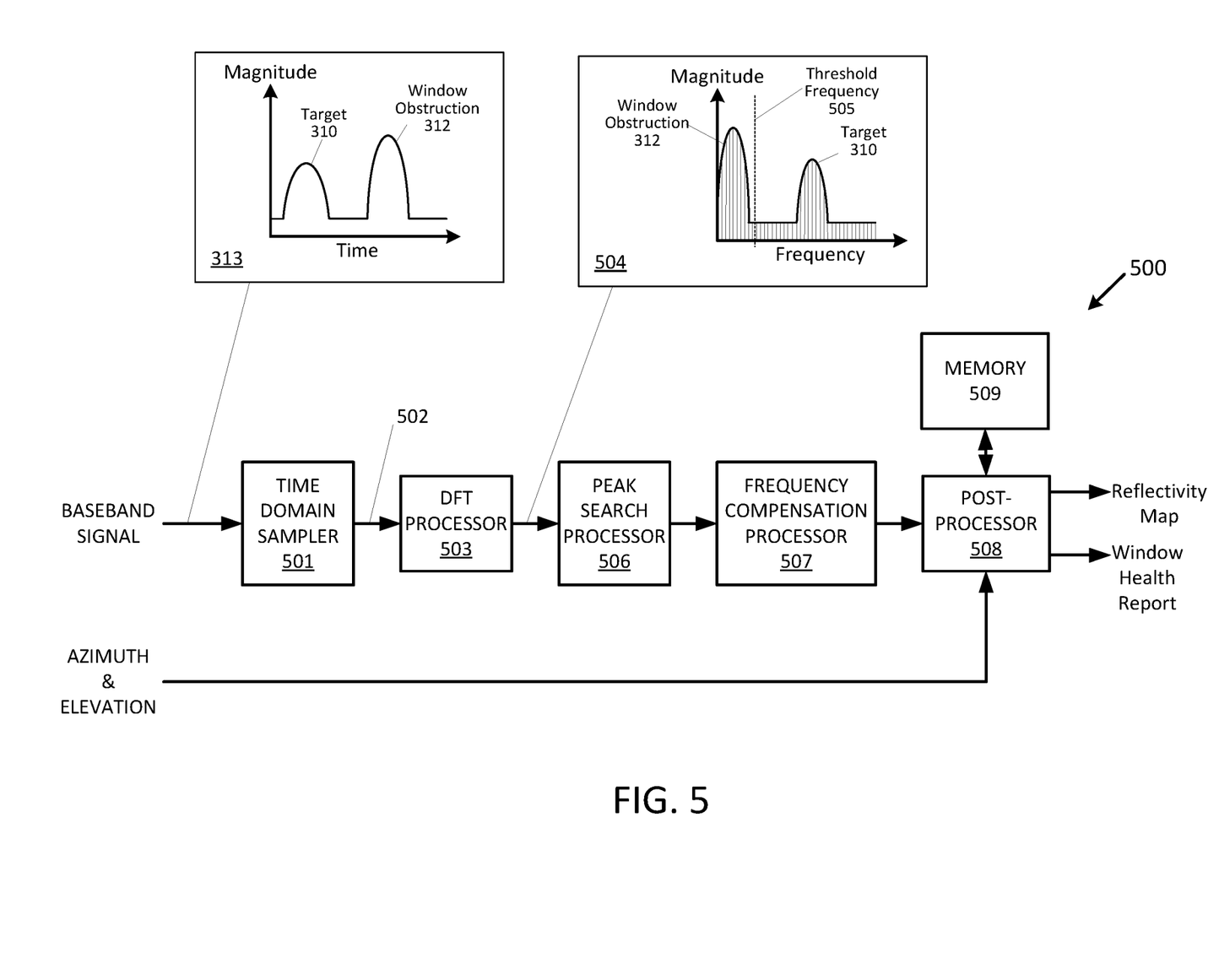
FIG. 5 is a block diagram illustrating an example signal processing system according to the present disclosure.

FIG. 5 is a block diagram illustrating an example signal processing system 500 according to embodiments of the present disclosure. Signal processing system 500 may include all or part of one or more components described above with respect to FIG. 1, including without limitation, signal conversion unit 106, signal conditioning unit 107, LIDAR control systems 110, signal processing unit 112 and motion control system 105. Each of the functional blocks in signal processing system 500 may be realized in hardware firmware, software or some combination of hardware, firmware and software. In FIG. 5, the range-dependent baseband signal 313 generated from optical processing system 300 is provided to a time domain sampler 501 that converts the continuous range-dependent baseband signal 313 into a discrete time domain sequence 502. The discrete time sequence 502 is provided to a discrete Fourier transform (DFT) processor 503 that transforms the discrete time domain sequence 502 into a discrete frequency domain sequence 504. It will be appreciated that in the discrete frequency domain sequence 504, the frequencies associated with obstruction 312 are lower than those frequencies associated with the target 310 because the round trip time to the obstruction 312 and back is less than the round trip time to the target 310 and back, and that the beat frequency in the range-dependent baseband signal is proportional to range. That is, $\Delta f_R(t) = k \Delta t$, where $\Delta f_R$ is the beat frequency, $\Delta t$ is the round trip travel time, and k is the slope of the chirp waveform as described above with respect to FIG. 2.

Since the geometry of the LIDAR system is known, including the distance of the LIDAR window from the optical source, it can be determined that any beat frequencies below a given threshold frequency, such as threshold frequency 505 in FIG. 5, are associated with a LIDAR window obstruction. The discrete frequency domain sequence 504 is provided to a peak search processor 506 that searches for and identifies energy peaks in the frequency domain to identify both target returns (e.g., target return 311-1) and returns from LIDAR window obstructions (e.g., return 311-2 from obstruction 312). In one example, signal processing system 500 also includes a frequency compensation processor 507 to correct and or remove frequency artifacts introduced by the system. For example, in some scenarios, the scanning process itself can introduce Doppler frequency shifts due to the high-speed rotation of mirrors in the optical scanner 301. After frequency compensation by the frequency compensation processor 507, the information provided by the peak search processor 506, including an energy-frequency profile of the return signal as reflected in the range-dependent baseband signal 313, is provided to a post-processor 508. Post-processor 508, using processing instructions stored in memory 509, combines the energy-frequency profile of the return signal with azimuth and elevation data from, for example, motion control system 105 from LIDAR system 100, to generate a reflectivity map of the field of view (FOV) of the LIDAR window and an overall window health report.

Figure 6:
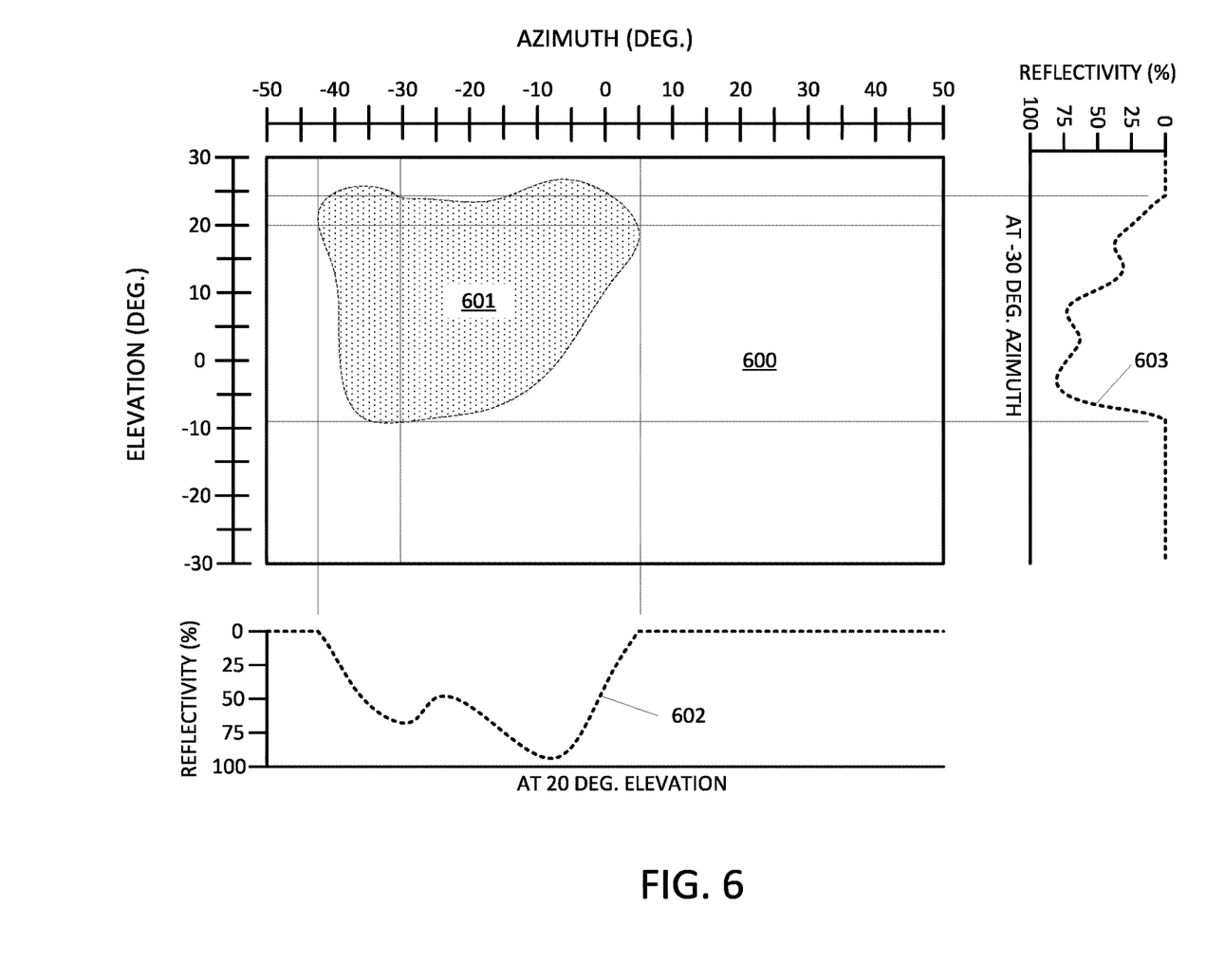
FIG. 6 is an illustration of an example of a LIDAR window reflectivity map according to the present disclosure.

FIG. 6 is an example of a reflectivity map 600. Example reflectivity map 600 includes a plot of a contiguous obstruction 601. Each point in the obstruction 601 represents a pixel in the FOV of a LIDAR window, such as LIDAR window 309 in the optical processing system 300 in FIG. 3, where each pixel is associated with an azimuth angle and an elevation angle. In the example of FIG. 6, the azimuth angle spans 100 degrees between −50 degrees and +50 degrees, and the elevation angle spans 60 degrees between −30 degrees and +30 degrees. The reflectivity of the LIDAR window can be plotted as a reflectivity contour at each elevation angle and each azimuth angle. For example, in FIG. 6, the reflectivity versus azimuth angle at an elevation angle of 20 degrees is illustrated by reflectivity contour 602. Similarly, the reflectivity versus elevation angle at an azimuth angle of −30 degrees is illustrated by reflectivity contour 603.

The reflectivity map and the window health report may be used by the signal processing unit 112 and LIDAR control systems 110 to determine any operational effects of the obstruction or obstructions, and to trigger any actions needed to mitigate the operational effects. According to some embodiments, a window health report includes details concerning which portions of the FOV of window 309 are blocked and the degree to which they are blocked. For example, the window health report may include information related to whether the LIDAR system 100 has enough visibility to operate safely. According to some embodiments, if the window health report indicates an unsafe operating state due to the level of window obstruction, the LIDAR control system 110 may direct the vehicle or other platform carrying the LIDAR system 100 to park in a safe location where corrective action may be taken. The reflectivity map and window health report can be used to map obstructed or impaired fields of view, to calculate maximum detection ranges in the impaired FOVs based on the amount of reflected energy from the obstruction(s) and the signal-to-noise ratios in the return signal. The signal processing unit 112 can use this information to determine if an obstructed FOV is a safety critical FOV such as the forward-looking field of view of a moving vehicle, for example. The signal processing system 500 can also determine if a reduction in maximum detection range is a safety critical impairment that would prevent the detection and avoidance of road obstacles or other moving vehicles beyond a safety critical minimum detection range. In one example involving a vehicle-mounted LIDAR system, the signal processing unit 112 and the LIDAR control systems 110 can take corrective action to mitigate the operational effects. Such corrective action could be sending control signals that cause the vehicle to slow in order to increase reaction times, to park in a safe location, and/or to implement a window cleaning procedure such as activating a window washing, window wiper system, for example.

Figure 7:
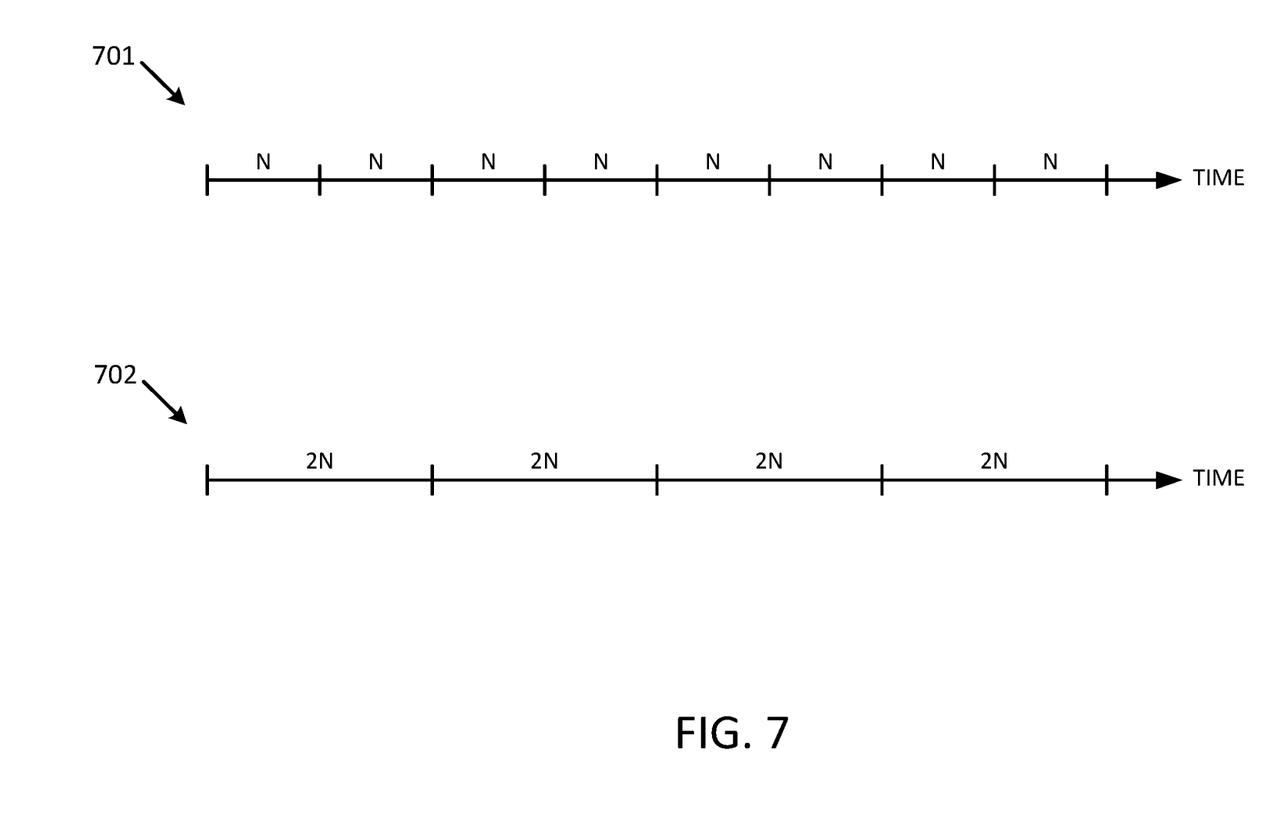
FIG. 7 is an example of sampling timelines illustrating the tradeoff between angular resolution and frequency resolution according to the present disclosure.

According to some embodiments, the LIDAR systems described herein can be configured with a sampling rate for use by the time domain sampler 501 to sample the range-dependent baseband signal 313, and the number of samples per pixel in the LIDAR window field of view. As shown by the timelines 701 and 702 of FIG. 7, the number of samples per pixel are assumed to have a fixed sampling rate. Timeline 701 illustrates N samples per pixel while timeline 702 illustrates 2N samples per pixel. The choice of the number of samples per pixel poses a tradeoff between angular resolution (i.e., precision of location of obstructions), and frequency resolution (which translates to range resolution). If the number of samples per pixel is lowered, then angular resolution can be increased and range resolution can be decreased. In another scenario, if the number of samples per pixel is increased, then angular resolution can be decreased and range resolution can be increased. According to some embodiments, the time domain sampler 501 can increase the sampling rate when window blockage has been detected in order to better resolve the portion of the FOV that is obstructed. An increase in the sampling rate can be used to increase angular resolution without sacrificing range resolution.

Figure 8:
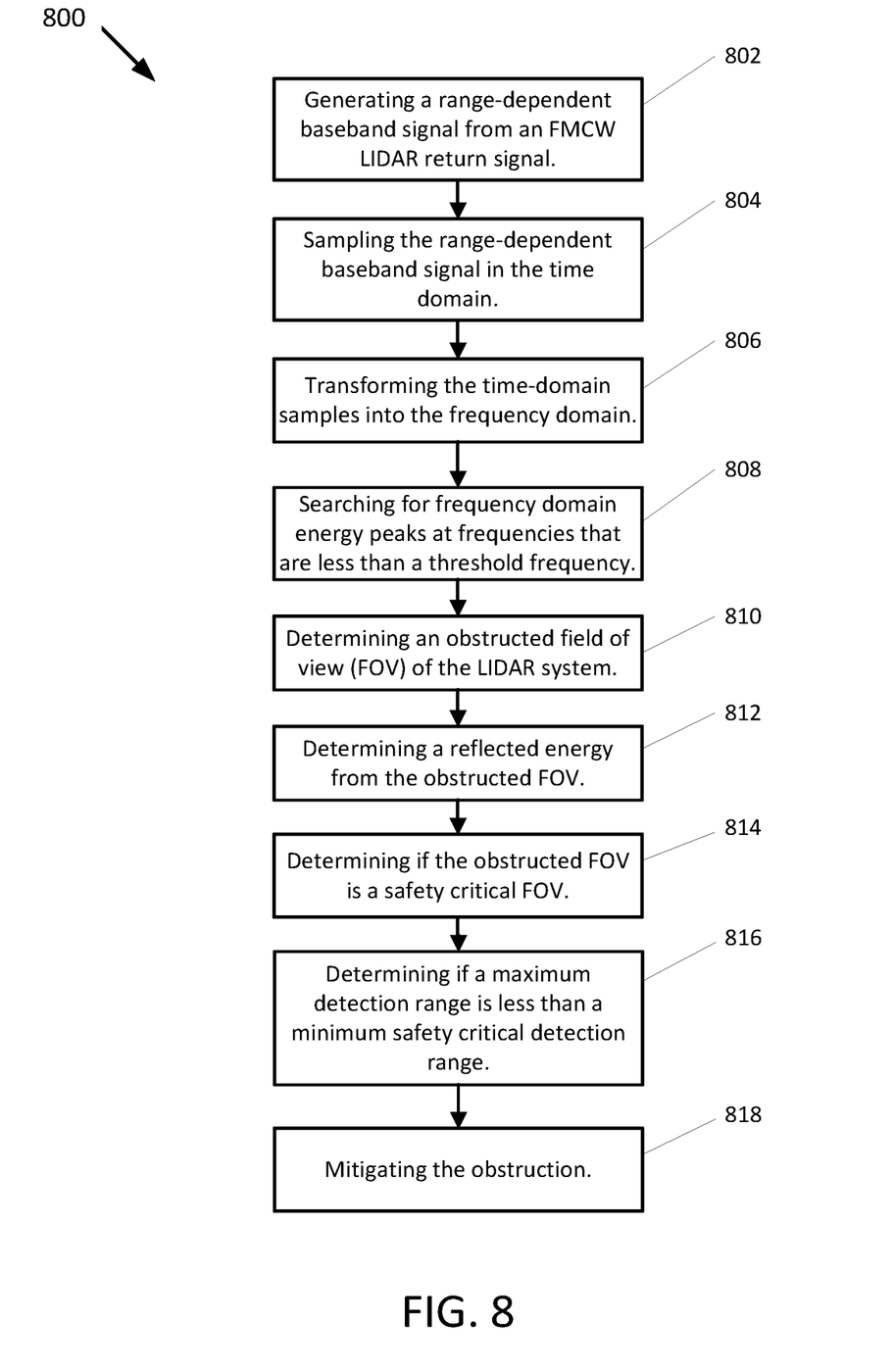
FIG. 8 is a flowchart illustrating an example method for detecting and evaluating a LIDAR window blockage according to the present disclosure.

FIG. 8 is a flowchart illustrating an example method 800 for detecting and mitigating the operational effects of a LIDAR window blockage according to the present disclosure. Method 800 begins at operation 802: generating a range-dependent baseband signal (e.g., baseband signal 313) from an FMCW LIDAR return signal (e.g., return signal 311). Method 800 continues at operation 804: sampling the range-dependent baseband signal in the time domain (e.g., with time domain sampler 501). Method 800 continues at operation 806: transforming the time domain samples into the frequency domain (e.g., with DFT processor 503). Method 800 continues at operation 808: searching for frequency domain energy peaks at frequencies that are less than a threshold frequency (e.g., with peak search processor 506). Method 800 continues at operation 810: determining an obstructed FOV of the FMCW LIDAR system (e.g., in post-processor 508). Method 800 continues at operation 812: determining the reflected energy in the obstructed FOV (e.g., from the reflectivity map generated by post-processor 508). Method 800 continues at operation 814: determining if the obstructed FOV is a safety critical FOV (e.g., by signal processing unit 112). Method 800 continues at operation 816: determining whether a maximum detection range is less than a minimum safety critical detection range (e.g., by signal processing unit 112). Method 800 concludes at operation 818: mitigating the obstruction (e.g., by automatically washing/wiping the window or by automatically directing the host vehicle of the LIDAR system to a safe location for subsequent cleaning).

Figure 9:
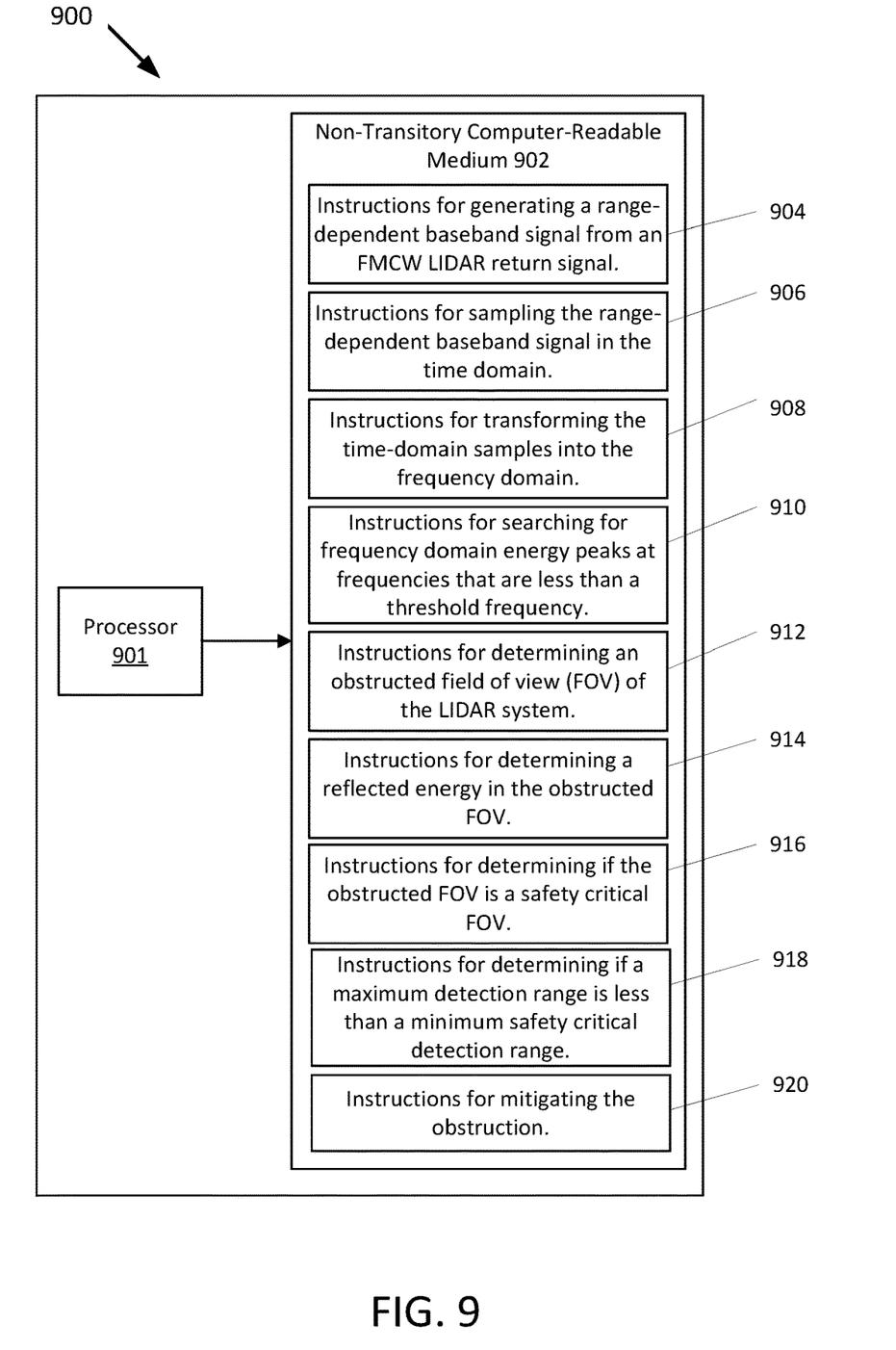
FIG. 9 is a block diagram illustrating a system for detecting and evaluating a LIDAR window blockage according to the present disclosure.

FIG. 9 is a block diagram of a system 900 for detecting and mitigating the operational effects of a LIDAR window blockage on an FMCW LIDAR system according to the present disclosure. System 900 includes a processor 901, which may be a part of signal processing unit 112 and/or signal processing system 500. System 900 also includes a memory 902 (e.g., a non-transitory computer-readable medium, such as ROM, RAM, flash memory, etc.) containing instructions that, when executed by processing device 901, cause the LIDAR system 100 to perform operations comprising the method for detecting and evaluating the operational effects of LIDAR window obstructions on the LIDAR system 100 as described with respect to FIG. 8. In particular, the non-transitory computer-readable memory 902 includes: instructions 904 for generating a range-dependent baseband signal from an FMCW LIDAR return signal (e.g., return signal 311); instructions 906 for sampling the range-dependent baseband signal in the time domain (e.g., with time domain sampler 501); instructions 908 for transforming the time-domain samples into the frequency domain (e.g., with DFT processor 503); instructions 910 for searching for frequency domain energy peaks at frequencies that are less than a threshold frequency (e.g., with peak search processor 506); instructions 912 for determining an obstructed field of view (FOV) of the LIDAR system (e.g., in post-processor 508); instructions 914 for determining a reflected energy in the obstructed FOV (e.g., from the reflectivity map generated by post-processor 508); instructions 916 for determining whether the obstructed FOV is a safety critical FOV (e.g., by signal processing unit 112); instructions 918 for determining whether a maximum detection range is less than a minimum safety critical detection range (e.g., by signal processing unit 112); and instructions 920 for mitigating the obstruction (e.g., by automatically cleaning/wiping the window or by automatically directing the host vehicle of the LIDAR system to a safe location for subsequent cleaning).

The preceding description sets forth numerous specific details such as examples of specific systems, components, methods, and so forth, in order to provide a thorough understanding of several examples in the present disclosure.

It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:
    an optical source to generate a frequency modulated continuous wave (FMCW) optical beam;
    a memory; and
    a processor, operatively coupled to the memory, to:
        identify energy peaks in a frequency domain of a range-dependent baseband signal that corresponds to a return signal from a reflection of the FMCW optical beam; and
        identify an obstruction of the LIDAR system based on a comparison of a frequency of the energy peaks to a threshold frequency.

2. The LIDAR system of claim 1, wherein the processor is further to generate a field of view (FOV) reflectivity map of an FOV of the LIDAR system based on the identification of the obstruction.

3. The LIDAR system of claim 2, wherein the FOV reflectivity map comprises a reflectivity contour at each elevation angle and each azimuth angle of the LIDAR system.

4. The LIDAR system of claim 1, wherein the processor is further to determine an operational effect of the obstruction on the LIDAR system.

5. The LIDAR system of claim 4, wherein, to determine the operational effect of the obstruction on the LIDAR system, the processor is to calculate a detection range of the LIDAR system based on the return signal and a signal-to-noise ratio of the return signal.

6. The LIDAR system of claim 4, wherein, to determine the operational effect of the obstruction on the LIDAR system, the processor is to identify portions of a field of view (FOV) of the LIDAR system that are blocked by the obstruction and a degree to which the portions of the FOV are blocked.

7. The LIDAR system of claim 1, wherein the processor is further to increase a sampling rate of the LIDAR system responsive to identifying the obstruction of the LIDAR system.

8. A method in a light detection and ranging (LIDAR) system, comprising:
    generating, by an optical source, a frequency modulated continuous wave (FMCW) optical beam;
    identifying, by a processor, energy peaks in a frequency domain of a range-dependent baseband signal that corresponds to a return signal from a reflection of the FMCW optical beam; and
    identifying an obstruction of the LIDAR system based on a comparison of a frequency of the energy peaks to a threshold frequency.

9. The method of claim 8, further comprising:
    generating a field of view (FOV) reflectivity map of an FOV of the LIDAR system based on the identification of the obstruction.

10. The method of claim 9, wherein the FOV reflectivity map comprises a reflectivity contour at each elevation angle and each azimuth angle of the LIDAR system.

11. The method of claim 8, further comprising:
    determining an operational effect of the obstruction on the LIDAR system.

12. The method of claim 11, wherein determining the operational effect of the obstruction on the LIDAR system comprises calculating a detection range of the LIDAR system based on the return signal and a signal-to-noise ratio of the return signal.

13. The method of claim 11, wherein determining the operational effect of the obstruction on the LIDAR system comprises identifying portions of a field of view (FOV) of the LIDAR system that are blocked by the obstruction and a degree to which the portions of the FOV are blocked.

14. The method of claim 8, further comprising:
    increasing a sampling rate of the LIDAR system responsive to identifying the obstruction of the LIDAR system.

15. A non-transitory computer-readable storage medium comprising instructions that, when executed by a processor in a light detection and ranging (LIDAR) system, cause the LIDAR system to:
generate, by an optical source, a frequency modulated continuous wave (FMCW) optical beam;
identify, by the processor, energy peaks in a frequency domain of a range-dependent baseband signal that corresponds to a return signal from a reflection of the FMCW optical beam; and
identify an obstruction of the LIDAR system based on a comparison of a frequency of the energy peaks to a threshold frequency.

16. The non-transitory computer-readable storage medium of claim 15, wherein the LIDAR system is further to generate a field of view (FOV) reflectivity map of an FOV of the LIDAR system based on the identification of the obstruction.

17. The non-transitory computer-readable storage medium of claim 16, wherein the FOV reflectivity map comprises a reflectivity contour at each elevation angle and each azimuth angle of the LIDAR system.

18. The non-transitory computer-readable storage medium of claim 15, wherein the LIDAR system is to determine an operational effect of the obstruction on the LIDAR system by calculating a detection range of the LIDAR system based on the return signal and a signal-to-noise ratio of the return signal.

19. The non-transitory computer-readable storage medium of claim 15, wherein the LIDAR system is to determine an operational effect of the obstruction on the LIDAR system by identifying portions of a field of view (FOV) of the LIDAR system that are blocked by the obstruction and a degree to which the portions of the FOV are blocked.

20. The non-transitory computer-readable storage medium of claim 15, wherein the LIDAR system is further to increase a sampling rate of the LIDAR system responsive to identifying the obstruction of the LIDAR system.

* * * * *